June 3, 1947.      W. J. SUTTON ET AL      2,421,659
SEAL FOR PIPE JOINTS
Filed Oct. 6, 1945
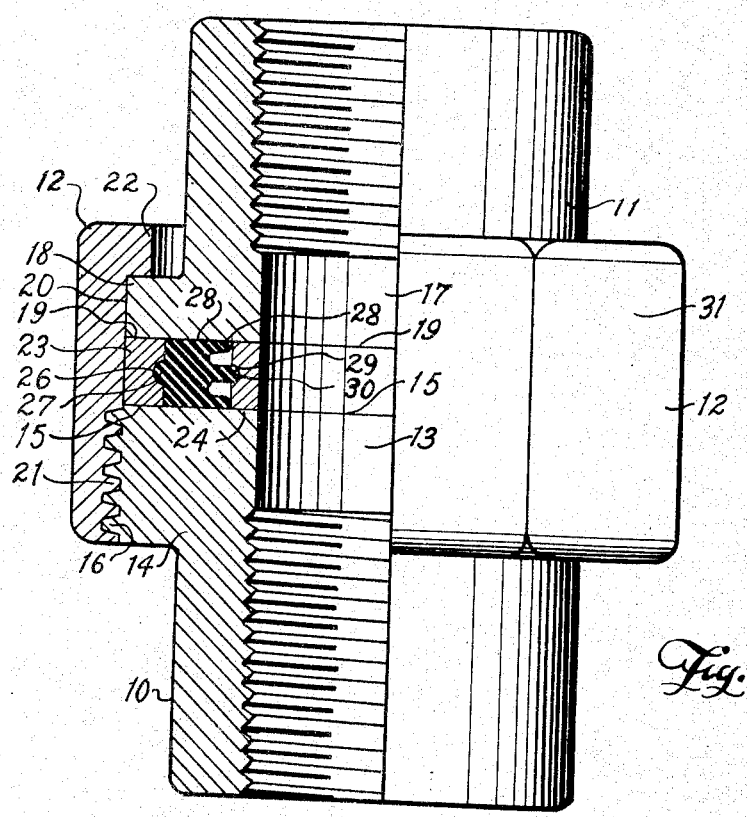
Fig. 1
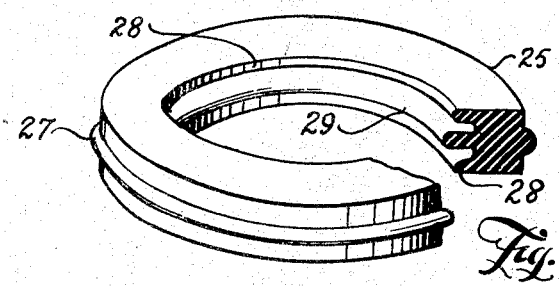
Fig. 2
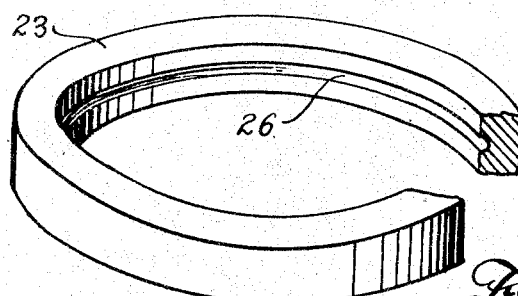
Fig. 4
Fig. 3
INVENTORS
Benjamin C. Simpson
and William J. Sutton
BY Jack A. Schley
Joseph H. Schley
ATTORNEYS Patented June 3, 1947

2,421,659

UNITED STATES PATENT OFFICE 2,421,659

SEAL FOR PIPE JOINTS

William J. Sutton and Benjamin C. Simpson, Houston, Tex., assignors to Wilson Supply Company, Houston, Tex., a corporation of Texas Application October 6, 1945, Serial No. 620,706

4 Claims. (Cl. 288—24)

This invention relates to new and useful improvements in unions.

One object of the invention is to provide an improved union for tubular conductors, such as pipes, involving a simple and effective fluid-pressure sealing means, whereby ground joints and close tolerances are avoided and efficient sealing at high pressures is provided.

A further object of the invention is to provide an improved union wherein expensive machining is eliminated and highly efficient sealing is obtained with a new and novel sealing unit.

An important object of the invention is to provide an improved union including coupling members and a packing unit may be inserted and removed transversely of the coupling without spreading said coupling members.

Another object of the invention is to provide an improved sealing unit for a union adapted to be disposed between flat end faces of the coupling members and including an intermediate fluid-pressure seal ring supported between concentric rings so as to respond to fluid pressure and seal against said faces.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a view, partly in elevation and partly in section, of a union constructed in accordance with the invention, Fig. 2 is a fragmentary isometrical view of the seal ring, Fig. 3 is an isometrical view of the shield ring, and Fig. 4 is a fragmentary isometrical view of the outer retaining ring.

In the drawings, the numeral 10 designates one of the coupling members of the union and 11, the other coupling member thereof. These members are coupled by a nut or collar 12 and a packing or sealing unit A is confined between the members and surrounded by the collar. The foregoing elements make up the union and its simplicity is obvious.

The member 10 is formed with an axial bore 13 which is partially screw-threaded in the usual manner to the end of a pipe or other conductor to which said member is adapted to be attached. At its inner end the member 10 is provided with an outwardly directed annular flange 14, which is flush with the inner end of the member, whereby a flat end face 15 is formed. The outer periphery of the flange is formed with coarse screw-threads 16.

The coupling 11 is made with an axial bore 17 complementary to the bore 13 and is partially screw-threaded as is common in this art. At its inner end the member is provided with an outwardly directed annular flange 18 which is flush with the inner end of the member, whereby a flat end face 19 complementary to the face 15 is formed. The collar 12 has an annular bore 20 which is provided with coarse screw-threads 21 at one end and with an inwardly directed annular flange 22 at its opposite end. The diameter of the bore 20 is ample to permit the collar to be freely shifted longitudinally of the member 11 and its flange 18, so that when the threads 21 are screwed into the threads 16, the overhanging flange 22 will engage the flange 18 and unite the coupling members.

The packing unit A includes an outer retaining ring 23 and an inner shield ring 24 with a fluid-pressure seal ring therebetween. The rings 23 and 24 may be made of metal or any other material suitable for the purpose; while the seal ring 25 may be formed of any suitable elastic or flexible material, such as synthetic rubber. The retaining ring is preferably wider than the shield ring and is provided in its inner face with an annular medial groove or recess 26. All three rings are of substantially the same thickness so that their flat faces may intimately contact the flat end faces 15 and 19 of the coupling members. The retaining ring is of such diameter as to cause its outer face to be substantially flush with the periphery of the flange 18; while the inner diameter of the shield ring is such as to cause its bore to aline with the bores 13 and 17 of the coupling members.

The seal ring 25 has an annular medial bead 27 on its outer periphery engaging in the recess 26 of the retaining ring. In its bore the seal ring has upper and lower inwardly directed annular lips 28, spaced from a medial, inwardly directed annular rib 29. The rib projects inwardly slightly beyond the lips and is sealed in an annular groove 30, formed in the outer periphery of the shield ring 24. The bead 27 and the rib 29 support the seal ring between the retaining and shield rings and also, tie the three rings together as a unit.

The rib 29 spaces the annular edges of the lips 28 sufficiently from the shield ring to permit a pressure fluid flowing through the union and bypassing between the shield ring and the end faces 15 and 19, to act against said lips on each side of the rib and expand said lips into fluid-tight contact with the end faces 15 and 19. The rings being assembled as a unit are readily and easily installed. It is not necessary to machine the faces 15 and 19 and the flat faces of the rings 23 and 24 to a fine finish or to grind or hone them to form ground joints.

The outer retaining ring 23 is slightly greater in thickness than the inner shield ring 24. This permits a metal-to-metal contact between the ring 23 and the end faces 15 and 19 and also, provides an adequate backing for the seal ring and prevents high fluid pressures from forcing the seal ring radially out of place or extruding its outer edges between the ring 23 and the coupling members. By making the ring 24 slightly less in thickness than the ring 23, the shield ring becomes, to a slight degree, a floating ring which will shield the seal ring from the abrasive effect of a fluid flowing through the union and at the same time allow sufficient pressure fluid to by-pass and expand the lips 28.

The collar 12 is provided with the usual exterior wrench faces 31 so it may be turned with a suitable tool. It is not necessary to tighten the collar to a high degree, but only to such an extent as to bring the faces 15 and 19 into contact with the ring 23 and to prevent vibration from loosening the coupling. When the collar 12 is loosened and slid back on the member 11, an unobstructed space is left between the faces 15 and 19 and thus, the unit A may be freely inserted transversely therebetween or removed transversely therefrom, without spreading the members 11 and 12 apart. This is a very advantageous feature as it makes for ready and expeditious coupling and uncoupling.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. As a sub-combination in a union, a seal ring having a medial annular bead on its outer periphery and an inwardly extending annular medial rib in its bore, and inwardly directed annular sealing lips on each side of said rib.

2. A packing unit for a union including, an outer ring, an inner ring disposed concentrically within the outer ring, and an elastic seal ring between the outer and inner rings having projections engaging in said rings for holding said rings together, and inwardly directed annular lips free to expand under fluid pressure.

3. A packing unit for a union including, an outer ring, an inner ring disposed concentrically within the outer ring, and an elastic seal ring between the outer and inner rings having projections engaging in said rings for holding said rings together, and inwardly directed annular lips free to expand under fluid pressure, the outer ring being of greater thickness than the inner ring, whereby the inner ring is free to float when the outer ring is confined between coupling members.

4. A packing unit for a union including, an outer ring having an annular recess in its bore, an inner ring within the outer ring spaced therefrom and having an annular groove in its bore, and a seal ring between the inner and outer rings having an external annular bead engaging in the recess of the outer ring and an internal annular rib engaging in the groove of the inner ring, whereby said rings are held together as a unit, the seal ring having internal annular fluid-pressure sealing lips.

WILLIAM J. SUTTON.
BENJAMIN C. SIMPSON.

REFERENCES CITED

The following references are of record in the file of this patent:

UNITED STATES PATENTS

| Number | Name | Date |
|---|---|---|
| 401,262 | Frisbie | Apr. 9, 1889 |
| 2,318,112 | Stillwagon | May 4, 1943 |
| 2,087,179 | Barker | July 13, 1937 |
| 1,359,142 | Allison | Nov. 16, 1920 |